United States Patent
Cox et al.

(10) Patent No.: US 12,214,678 B2
(45) Date of Patent: Feb. 4, 2025

(54) OVERMOLDED MECHANICAL FASTENER WITH INTEGRATED SEALING

(71) Applicant: Dana Automotive Systems Group, LLC, Maumee, OH (US)

(72) Inventors: Samuel Wesley Cox, Paris, TN (US); Christopher M. Cook, Mckenzie, TN (US); John Bruzewski, Buchanan, TN (US); Michael Kevin Nanney, Paris, TN (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 309 days.

(21) Appl. No.: 17/812,677

(22) Filed: Jul. 14, 2022

(65) Prior Publication Data

US 2024/0017626 A1    Jan. 18, 2024

(51) Int. Cl.
*B60L 50/64* (2019.01)
*H01R 4/64* (2006.01)

(52) U.S. Cl.
CPC ............... *B60L 50/64* (2019.02); *H01R 4/64* (2013.01)

(58) Field of Classification Search
CPC .................................. B60L 50/64; H01R 4/64
See application file for complete search history.

(56) References Cited

U.S. PATENT DOCUMENTS

| | | | |
|---|---|---|---|
| 4,650,274 A * | 3/1987 | Schmid | H01R 4/64 439/97 |
| 5,108,296 A * | 4/1992 | Takano | H01R 4/64 439/573 |
| 5,207,588 A * | 5/1993 | Ladouceur | F16B 37/065 411/181 |
| 5,441,417 A * | 8/1995 | Ladouceur | H01R 4/64 411/181 |
| 5,442,133 A * | 8/1995 | Arnold | B23K 35/0288 439/92 |
| 8,070,404 B1 * | 12/2011 | Schluter | F16B 41/002 411/368 |
| 8,742,255 B2 | 6/2014 | Pavlovic et al. | |
| 8,835,033 B2 | 9/2014 | Choi et al. | |
| 8,997,336 B2 * | 4/2015 | Strizki | H01R 43/005 29/745 |
| 2012/0050114 A1 * | 3/2012 | Li | H01Q 1/243 343/702 |
| 2012/0103714 A1 | 5/2012 | Choi et al. | |
| 2013/0135797 A1 * | 5/2013 | Pavlovic | H05K 7/20927 361/679.01 |

(Continued)

FOREIGN PATENT DOCUMENTS

DE    102023126370 A1 *    4/2024    ............. B60L 50/64

*Primary Examiner* — Erez Gurari
(74) *Attorney, Agent, or Firm* — McCoy Russell LLP

(57) ABSTRACT

A method and system are provided for a fastening system comprising: an electrically conductive continuous unitary structure, such as an electrically conductive stud, overmolded into an enclosure, the electrically conductive stud extending from an interior of the enclosure to an exterior of the enclosure. The fastening system may act as a structural member transferring mechanical forces away from the battery enclosure, secure the battery enclosure to a mount, aid in sealing the battery enclosure, and act as an electrical grounding path for the battery through an enclosure formed of a non-electrically conductive composite material.

10 Claims, 6 Drawing Sheets

(56) References Cited

U.S. PATENT DOCUMENTS

| | | | | |
|---|---|---|---|---|
| 2016/0315421 A1* | 10/2016 | Andou | ............... | H01R 11/12 |
| 2017/0171960 A1* | 6/2017 | Yang | ............... | H05K 1/0215 |
| 2017/0324228 A1* | 11/2017 | Garcia | ............... | F16B 2/241 |
| 2020/0076056 A1* | 3/2020 | Froese | ............... | H04B 7/10 |
| 2021/0168230 A1* | 6/2021 | Baker | ............... | G06F 1/1698 |
| 2023/0387532 A1* | 11/2023 | Laskowski | ............... | H01M 50/242 |
| 2023/0421683 A1* | 12/2023 | McGuire | ............... | H04M 1/0264 |
| 2024/0017626 A1* | 1/2024 | Cox | ............... | B60L 50/64 |
| 2024/0113376 A1* | 4/2024 | Tomlinson | ............... | H01M 50/262 |
| 2024/0356185 A1* | 10/2024 | Tang | ............... | H01M 50/262 |

\* cited by examiner

OVERMOLDED MECHANICAL FASTENER WITH INTEGRATED SEALING

TECHNICAL FIELD

The present description relates generally to systems for a fastener for a battery enclosure.

BACKGROUND AND SUMMARY

A battery assembly, including a battery, may be installed in an automotive vehicle. The battery may be housed within a casing or enclosure to shield the battery from contact with external objects, provide a thermal barrier to inhibit heat conduction from the battery to surrounding components, and/or maintain the position of the battery relative to the vehicle.

In some vehicle examples, the battery may be relatively large to provide sufficient power to meet the vehicle's energy demands.

However, the inventors herein have recognized potential issues with battery enclosures for relatively large battery packs. For example, the relatively large size of the battery pack can cause the enclosure weight to increase substantially. While the weight of a battery enclosure may be reduced through the use of non-electrically conductive composite materials, there may be greater difficulty grounding the battery compared to non-composite metal enclosures.

In one example, the issues described above may be addressed by a fastening system comprising an electrically conductive stud overmolded into a battery enclosure, the electrically conductive stud extending from an interior of the enclosure to an exterior of the enclosure to provide an electrical grounding path through the enclosure.

Such an approach may thus enable a non or less electrically conductive composite material to format least some portions of the battery enclosure as the fastening system may provide structural integrity and enable electrical grounding.

As an example, the enclosure may include a tray formed of a thermoplastic polymer material such as a polymer composite. The electrically conductive stud may be overmolded onto the composite tray and may configured as a dowel that extends from within the enclosure to an external mounting structure. A geometry of the fastening system may assist in maintaining the fastening system in place at the enclosure. The enclosure may include more than one of the fastening system overmolded to the enclosure, each of the fastening systems providing an electrical grounding path from within the enclosure to outside of the enclosure.

In this way, overmolding the electrically conductive fastening system onto the composite tray of the enclosure may increase a mechanical integrity of the enclosure. The technical effect of extending the fastening system from inside the enclosure to outside of the enclosure is that an electrical grounding path may be provided for electric components of the battery in spite of being enclosed and sealed within a nonconductive casing. Further, protrusion of the fastening system into an interior of the enclosure allows the fastening system to be readily located within the enclosure during assembly, thereby enabling interfacing structures of the enclosure and battery to be easily aligned and coupled. Protrusion of the fastening system outside of the enclosure, where an outer portion of the fastening system includes threaded surfaces, enables mechanical fastening of the enclosure when engaged with a nut. An overall configuration of the fastening system, and interfacing of the fastening system with the enclosure, promotes distribution of mechanical forces to alleviate localized stress imposed on the enclosure when the enclosure is assembled and sealed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
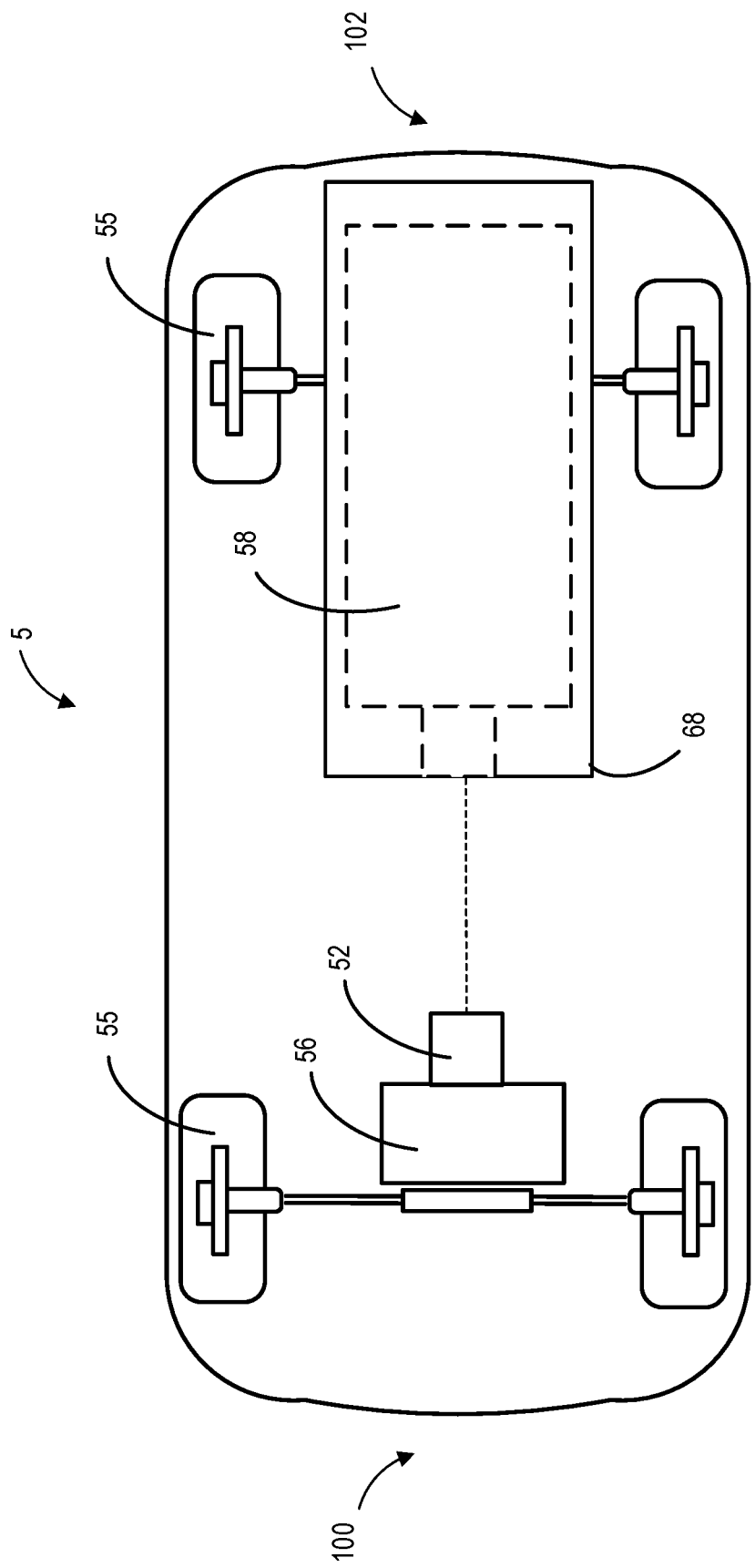
FIG. 1 shows an example of a vehicle which may include a battery as part of the vehicle's powertrain.
Figure 2A:
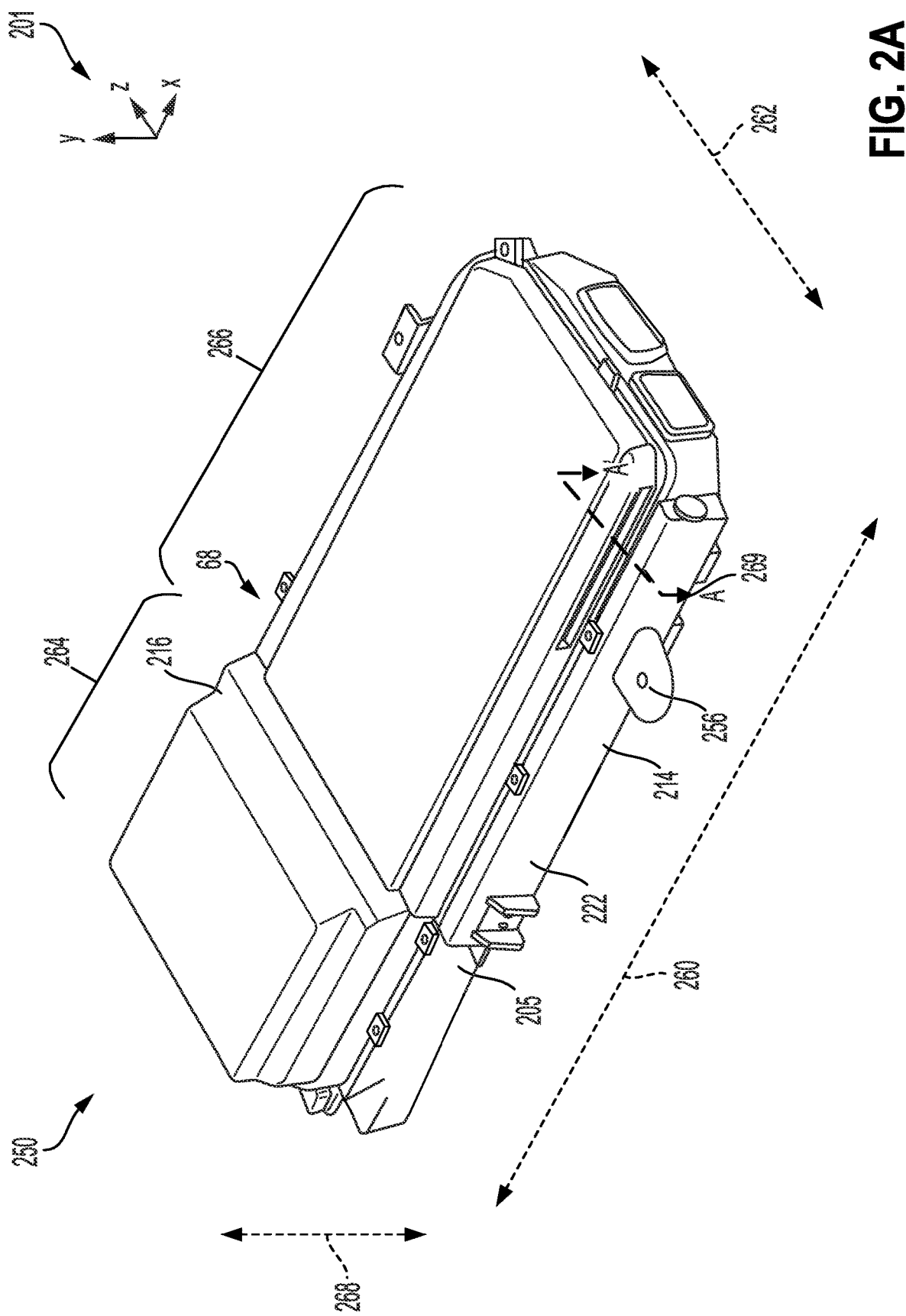
FIG. 2A shows an example of a mounting assembly for a battery having an enclosure formed of a composite material.
Figure 2B:
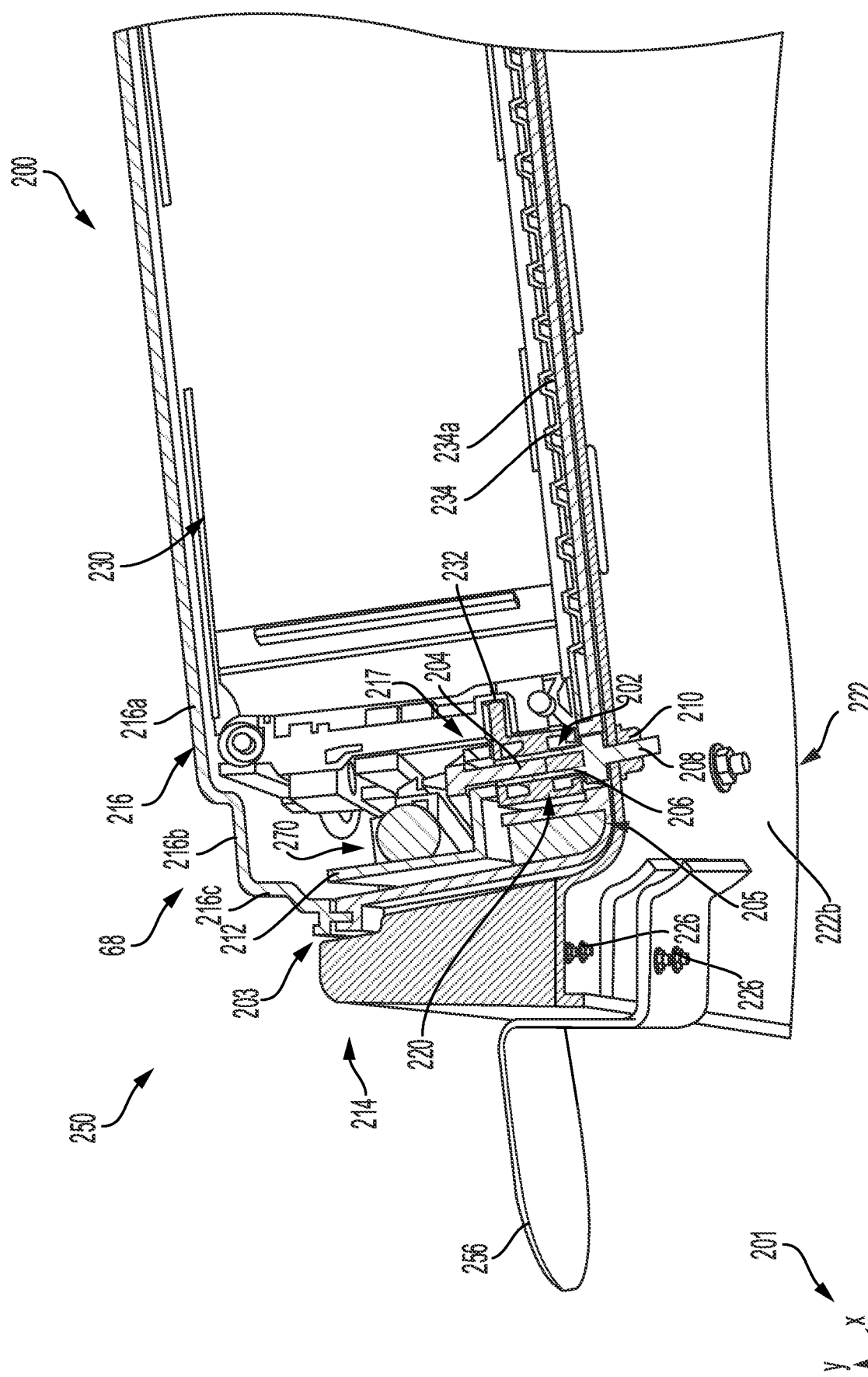
FIG. 2B shows a first cross-sectional view of a portion of the mounting assembly of FIG. 2A, the portion including the enclosure and a metallic fastening system.
Figure 3:
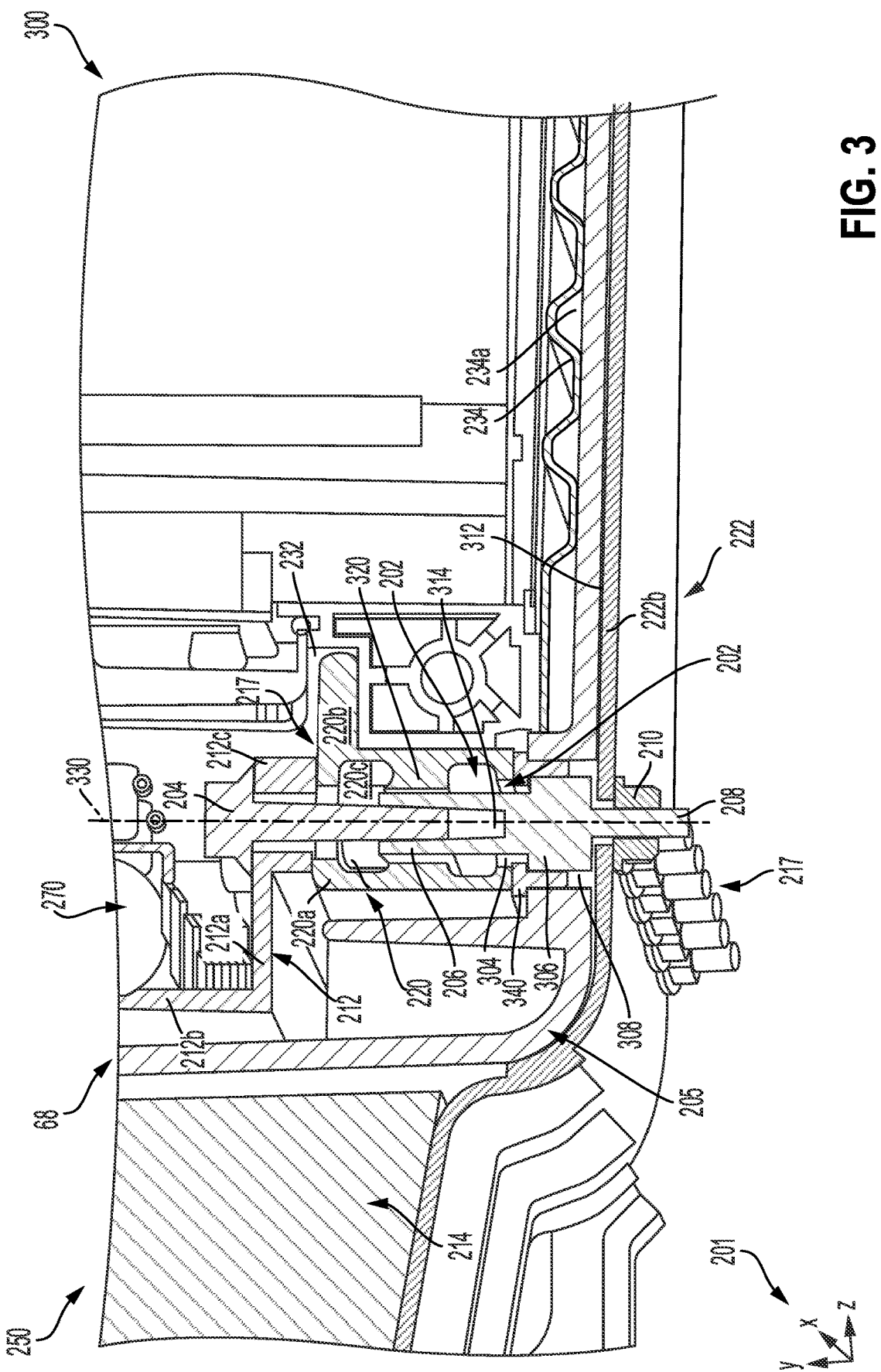
FIG. 3 shows a second cross-sectional view of the mounting assembly, including the enclosure and the metallic fastening system.
Figure 4:
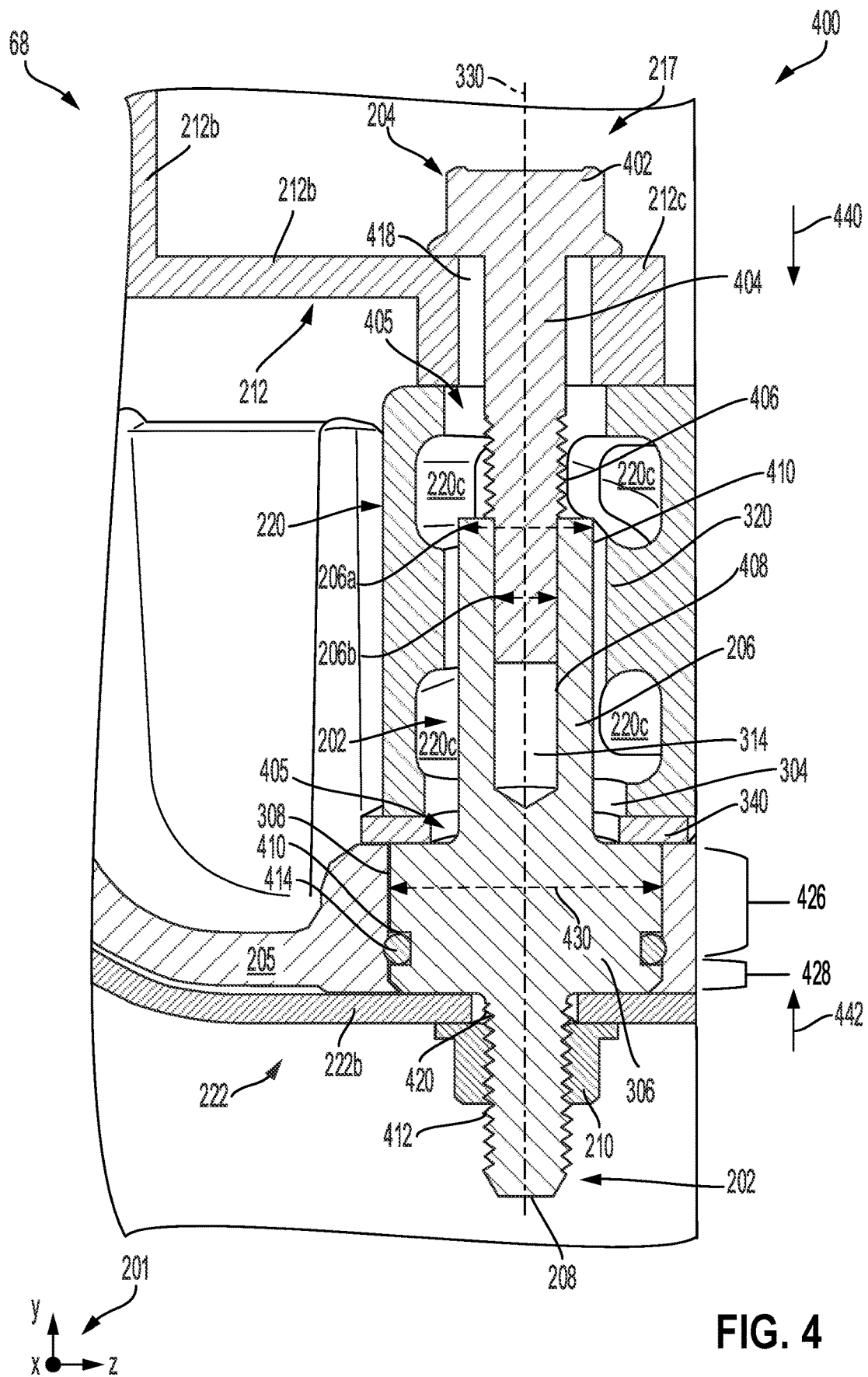
FIG. 4 shows a third cross-sectional view of the mounting assembly illustrating details of the metallic fastening system.

The following description relates to systems and methods for a composite battery enclosure or casing and a fastener overmolded therein. The battery enclosure may be implemented to secure and enclose a battery within a vehicle. For example, the vehicle may be a hybrid or all-electric vehicle, as shown in FIG. 1, and the battery may be configured to power an electric machine to provide torque to the vehicle wheels. The battery may be enclosed within a casing or housing referred to herein as a battery enclosure, where the battery enclosure may be formed of a non-metallic, composite material, e.g., a composite battery enclosure. An example of a mounting assembly for the battery, including the composite battery enclosure and an electrically conductive fastening system or fastener, is depicted in FIG. 2A. The electrically conductive fastening system may be used to secure a position of the composite battery enclosure to a stationary structure external to the composite battery enclosure. The mounting assembly, is shown in various cross-sectional views in FIGS. 2B-4. For example, a first cross-sectional view of the mounting assembly is shown in FIG. 2B. A second cross-sectional view of FIG. 3 shows a more detailed view of a portion of the composite battery enclosure from a different angle and a third cross sectional view shown in FIG. 4 shows more detailed view of the electrically conductive fastening system. A component, e.g., a stud, of the electrically conductive fastening system is depicted in isolation in FIG. 5.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced. FIGS. 2A-5 are shown approximately to scale. FIGS. 2A-5 may be used to represent other relative dimensions. As used herein, the term "substantially" is construed to mean plus or minus five percent of the range unless otherwise specified.

Further, FIGS. 2A-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Turning to FIG. 1, an example vehicle 5 is shown. In some examples, vehicle 5 may be a hybrid vehicle with multiple sources of torque available to one or more vehicle wheels 55. In other examples, vehicle 5 may be an all-electric vehicle, powered exclusively by an energy storage device such as a battery 58. In the example shown, vehicle 5 includes an electric machine 52 which may be an electric motor, an electric motor/generator, or an electric motor/engine. Electric machine 52 receives electrical power from the battery 58 which is converted to rotational energy, e.g., torque, at a transmission 56. The torque is delivered to vehicle wheels 55, which includes a set of front wheels proximate to a front end 100 of vehicle 5 and a set of rear wheels proximate to a rear end 102 of vehicle 5. Electric machine 52 may also be operated as a generator to provide electrical power to charge the battery 58, for example, during a braking operation.

FIG. 1 shows an embodiment where electric machine 52 provides rotational energy to the front wheels of vehicle 5 via the transmission 56. For this example, the embodiment of vehicle 5 has electric machine 52 and the transmission 56 closest to the front end 100 of vehicle 5. It will be appreciated that in other examples, rotational energy may be alternatively provided to the rear wheels of vehicle 5. Furthermore, in other examples, each of the front wheels and the rear wheels may be coupled to individual transmissions, such as when vehicle 5 is configured with all-wheel drive. As well, in other embodiments, transmission 56 and/or electric machine 52 may be arranged closer to the rear end 102 of vehicle 5 rather than the front end 100.

The battery 58 may be between the vehicle wheels 55 and closer to the rear end 102 of vehicle 5 than the front end 100. For example, the battery 58 may be positioned below rear passenger seats of the vehicle. In another example, the battery 58 may be located in a floor of a rear compartment of the vehicle or may be integrated into a vehicle chassis. In other examples, however, the battery 58 may be located in a different relative position within vehicle 5 than shown in FIG. 1. The battery 58 may be enclosed and secured within a battery enclosure 68. At least a part of the battery enclosure may be formed of a rigid nonmetal material, such as a polymer. In one example, the material used may be a thermoplastic polymer composite. The battery enclosure 68 may entirely enclose the battery 58, providing a barrier between the battery 58 and external components, and absorbing vibrations from the vehicle that would otherwise be imparted to the battery 58.

In one example, the battery enclosure 68 of FIG. 1 may be formed of a non-conductive, composite material, such as a thermoplastic polymer composite, hereafter, a composite battery enclosure 68. As shown in FIG. 2A, the composite battery enclosure 68 may be included in a mounting assembly 250. The mounting assembly 250 may support a battery or battery assembly housed within the composite battery enclosure 68, such as a battery assembly 230 shown in FIGS. 2B-4 and described further below.

A set of reference axes 201 are provided for comparison between views shown in FIG. 2A-5. The reference axes 201 indicate a y-axis, an x-axis, and a z-axis. In one example, the y-axis may be parallel with a direction of gravity and the x-z plane may be parallel with a horizontal plane that the battery enclosure 68 may rest upon. When referencing direction, positive may refer to in the direction of the arrow of the y-axis, x-axis, and z-axis and negative may refer to in the opposite direction of the arrow of the y-axis, x-axis, and z-axis.

In an example, the vehicle may be a pick-up truck or SUV. The vehicle may have a truck bed, below which the battery enclosure is positioned.

As illustrated in FIG. 2A, in addition to the composite battery enclosure 68, the mounting assembly 250 includes a mounting bracket 222, at least one electrical port and coolant ports (e.g., inlets and outlets), and a plurality of support structures 256, such as arms and tabs, coupled to the mounting bracket 222 for attaching the mounting bracket 222 to a stationary object, relative to the vehicle, as an example vehicle 5, outside of the battery enclosure 68. As an example, a stationary object may be a vehicle frame or chassis. The composite battery enclosure 68 may be seated on top of the mounting bracket 222 and may support a weight of the composite battery enclosure 68 as well as maintain a position of the composite battery enclosure 68 with respect to the vehicle.

The mounting assembly 250 further includes a crumple box 214 extending along at least one side of the battery enclosure 68, parallel with the x-axis, along at least a portion of a length 260 of the battery enclosure 68. It is to be appreciated the geometry and features of the crumple box 214 are non-limiting examples and different geometries and features are possible.

As shown in FIG. 2A, the composite battery enclosure 68 may be formed of a sealing tray 205 and a top cover 216. The sealing tray 205 may form a lower portion of the composite battery enclosure 68 and the top cover 216 may form an upper portion of the composite battery enclosure 68. Both the sealing tray 205 and the top cover 216 may be formed of the composite material and may couple to one another around a perimeter of the composite battery enclosure 68. The sealing tray 205 and the top cover 216 may form a sealed housing with an inner cavity when coupled and fastened to one another.

The length 260 of the composite battery enclosure 68 may be greater than a width 262 of the composite battery enclosure 68, as shown in FIG. 2A. The composite battery enclosure 68 may include a first portion 264 and a second portion 266. The second portion 266 is continuous with and contiguous to the first portion 264 along the z-axis. A height 268 of the composite battery enclosure 68 may be greater along the first portion 264 than along the second portion 266. The second portion 266 may form a greater portion of the overall length 260 of the composite battery enclosure 68 than the first portion 264.

The second portion 266 of the composite battery enclosure 68 may house a plurality of battery cells, e.g., a battery array or battery pack, of a battery assembly (e.g. 230 in FIGS. 2B-3). Thus, the second portion 266 may also enclose other components used to support the plurality of battery cells, such as various electronic couplings and devices, a heat management system such as a cooling plate, as shown in FIGS. 2B-3, etc. The first portion 264 may also house at least a portion of the plurality of battery cells as well as various electrical components/support structures. The second portion 266 also contains a plane 269 stretching a distance A to A' co-planer with an y-z plane. Plane 269 may form a cutout upon which the first cross-section 200, second cross-section 300, and third cross-section 400 may be viewed upon.

The battery enclosure 68 may thereby shield components housed therein from contact with objects external to the battery enclosure 68 and from exposure to fluids, debris, and other materials which may adversely affect operation of the battery assembly. The battery enclosure 68 may be formed of composite materials, such as a thermoplastic polymer composite. Therein, the battery enclosure 68 may be a composite enclosure. Forming the battery enclosure 68 from composite materials, rather than from metal may offer a variety of benefits. For example, a mass of a composite enclosure, e.g. the battery enclosure 68, may be reduced relative to a metal enclosure while maintaining a sealing and shielding capability of the battery enclosure 68 with respect to the battery assembly sealed therein. The reduced mass of a composite enclosure, such as the battery enclosure 68, may allow less tractive effort to be output by prime movers of the vehicle, such as from the battery and/or from an engine and/or electric machine, therefore decreasing energy consumption of the vehicle.

However, unlike metal, the thermoplastic polymer composite may be relatively electrically non-conductive. Establishing an electrical grounding path for the battery assembly may therefore be challenging. Furthermore, the composite materials may have different mechanical properties from metal, such as lower ductility, shear strength, etc. The composite materials may be less tolerant of localized exertion of force on the battery enclosure, such as at mechanical fasteners used for sealing the battery enclosure.

In one example, as described herein, the composite battery enclosure may include mechanical fasteners configured to provide an electrical grounding path from within the battery enclosure to outside (e.g., to one or more regions external of) of the battery enclosure. Furthermore, the mechanical fasteners may transmit structural loads from within the composite battery enclosure to an external frame in addition to providing electrical grounding without adversely affecting a sealing capability of the composite battery enclosure. An example of a composite battery enclosure using the mechanical fasteners is shown in FIGS. 2B-4. It will be appreciated that while discussion of the mechanical fasteners is directed to a battery enclosure herein, the mechanical fasteners may be similarly applied to various other composite enclosures, such as inverter housings, enclosures for power electronics, etc.

Turning to FIG. 2B, a first cross-section 200 a portion of the mounting assembly 250, including the battery enclosure 68, is shown. The components of the mounting assembly 250 shown in FIG. 2B also includes the crumple box 214, a fastening system 217, and the mounting bracket 222. The fastening system 217 may be used to fasten the interior components of the battery enclosure 68 and fastens the mounting bracket 222 to the battery enclosure 68. The fastening system 217 is described in greater detail with reference to FIGS. 3-5.

As shown in FIGS. 2A and 2B, the battery enclosure 68 may be at least partially surrounded and supported by components of the mounting assembly 250, such as the crumple box 214 and the mounting bracket 222. The mounting bracket 222, for example, may support a mass of the battery enclosure and partially enclose a lower portion (e.g., with respect to the y-axis) of the battery enclosure 68. For example, the mounting bracket 222 may at least partially surround the sealing tray 205 of the battery enclosure 68. The mounting bracket 222 may include regions such as a lower surface 222b and a plurality of support structures 256. However, it is to be appreciated that the geometry and features of battery enclosure 68 and mounting assembly 250, including the plurality of support structures 256, are non-limiting, and other geometries and configurations are possible.

As shown in FIG. 2B, the battery enclosure 68 may be seated upon and be supported by the lower surface 222b, which may be a planar floor of the mounting bracket 222 that is arranged co-planar with the x-z plane. The lower surface 222b of the mounting bracket 222 may be positioned below the sealing tray 205 along the y-axis and may be in face-sharing contact with the sealing tray. In other words, a bottom face of the sealing tray 205 may directly contact an upper face of the lower surface 222b of the mounting bracket 222.

As shown in FIG. 2B, the mounting bracket 222 may serve as a bracket for supporting the crumple box 214. Additionally, the mounting bracket 222 may provide a base to which at least some of the plurality of support structures 256 may be fastened to. Fasteners 226 may be used to secure the crumple box 214 and/or the plurality of support structures 256 to the mounting bracket 222. It is to be appreciated the geometry and features of the mounting bracket 222 are non-limiting examples and different geometries and features are possible. Additionally, it is to be appreciated the mounting bracket 222 may have additional functions not presented in the example.

As described above, the mounting bracket 222 may support the battery enclosure 68, and, therefore, also support a weight and position of the battery assembly 230. When fastened to the lower surface 222b, the battery enclosure 68 and battery assembly 230 may be maintained stationary relative to the vehicle. The plurality of support structures 256 may fasten the mounting assembly 250 to a surface or structure of the vehicle, such as the vehicle frame or chassis.

As shown in FIG. 2B, the battery assembly 230 may be enclosed by the top cover 216 and the sealing tray 205, the top cover 216 and the sealing tray 205 forming the battery enclosure 68. The sealing tray 205 may extend along the length of the second portion 266 of the battery enclosure 68 (e.g., along the x-axis) and may also line the mounting bracket 222 along a width 262 of the battery enclosure 68 (e.g., along the z-axis). The sealing tray 205 may be formed of a non-conductive, non-metallic, composite material, such as a thermoplastic polymer composite. The sealing tray 205 is positioned below, e.g., under, the top cover 216, with respect to the y-axis, and coupled to the top cover 216 along a top edge of the sealing tray 205, at the coupling region 203. The top cover 216 may have a similar width and length as the sealing tray 205. In one example, top cover 216 may be formed of a same non-conductive, composite material, such as a thermoplastic polymer composite as the sealing tray 205.

As shown in FIG. 2B, the top cover 216 has a horizontal surface 216a that is coplanar with the x-z plane and has a rectangular outer geometry when viewed along the y-axis. The top cover 216 has a plateau region 216b contiguous and continuous with the horizontal surface 216a. The plateau region 216b may be lower than the horizontal surface 216a along the y-axis and may extends from the horizontal surface 216a along the z-axis and transition into a vertical wall 216c of the top cover 216. The vertical wall 216c may be coplanar with the x-y plane and extend the along the x-axis, e.g., along at least a portion of the length of battery enclosure 68. The plateau region 216b and vertical wall 216c of the top cover 216 extend around a portion of a perimeter of the horizontal surface 216a.

The top cover 216 and the sealing tray 205 may have a sealing engagement at the coupling region 203 such that the inner components of the battery enclosure 68 are sealed therein. For example, the top cover 216 and the sealing tray 205 may form a sealed interface at a coupling region 203. As such, the sealing tray 205 and top cover 216 may form a sealed shell that encloses the battery assembly 230 and other components of the battery enclosure 68. When enclosing the battery assembly 230, the top cover 216 may be located above the battery assembly 230, while the sealing tray 205 may be located under the battery assembly 230. The coupling region 203 of the sealing tray 205 and top cover 216 may extend continuously around the perimeter of the battery enclosure 68. When mated to one another, the shell formed by the top cover 216 and the sealing tray 205 may enclose components including the battery assembly 230, the metal structure 212, the battery frame 220, the bolt 204, and various other electronic components.

As shown in FIG. 3, a heat shield 312 may be located between the sealing tray 205 and the mounting bracket 222 along the y-axis. The heat shield 312 may reflect radiated thermal energy away from the battery enclosure 68 from components external to the electric machine or other components of the vehicle. For example, the heat shield 312 may be a sheet formed from a thermally deflecting material. The heat shield 312 may reduce the transfer of thermal energy from the exterior of the battery enclosure 68 to the battery assembly 230.

Turning back to FIG. 2B, a cooling plate 234 may be sandwiched between the battery assembly 230 and the sealing tray 205. As shown in FIG. 2B, the cooling plate may be arranged co-planar with the x-z plane and in contact with the battery assembly 230 and the sealing tray 205. The cooling plate 234 may be formed of a rigid material of a high thermal conductivity, such as aluminum. Thermal energy and waste heat from the battery assembly 230 may be transferred to the cooling plate 234 through conduction. The cooling plate 234 may then transfer thermal energy and heat from the battery assembly 230 to a cooling medium, such as cooling gas or liquid, where the cooling medium travels through channels 234a of the cooling plate 234. The cooling plate 234 may also form a sealed barrier between the cooling medium and the battery assembly 230. A geometry of the cooling plate 234 may include ridges and troughs, thereby increasing a surface area of the cooling plate 234. The cooling plate 234 and heat shield 312 may reduce a likelihood of overheating at the battery assembly 230 and battery 58.

The battery assembly 230 of the mounting assembly 250 is therefore enclosed within the battery enclosure 68 such that the battery assembly 230 does not contact the mounting bracket 222. The sealing tray 205 of the battery enclosure is shielded from external objects by the crumple box 214. Likewise, the mounting bracket 222 may be spaced away from external objects or structures positioned directly below the mounting assembly 250 by a bottom mounting structure. As described above, the battery assembly 230 may include a single battery or an array of batteries, such as the battery 58 of FIG. 1, as well as additional electronic components electrically coupled to the battery or the array of batteries. During operation, the battery assembly 230 may produce excess or static charge. Grounding of the battery assembly 230 is therefore demanded to mitigate accumulated static or excess charge which may cause degradation to electronic components of the battery assembly 230. While the battery enclosure 68 is formed of a non-conductive material and unable to provide electrical grounding for the battery assembly 230, the fastening system 217, which may include electrically conductive components, may provide a grounding path through the battery enclosure 68.

The fastening system 217 may serve as both a fastener to secure the battery enclosure 68 to the mounting bracket 222, and as an electrically conductive path through the battery enclosure 68. For example, the fastening system 217 may be configured to receive compressive and mechanical forces which may be directed into the fastening system 217 to attach the battery enclosure 68 to the mounting bracket 222, thereby distributing the forces away from the material of the battery enclosure 68. Components of the fastening system 217 may interface with the sealing tray such that the sealing tray is not compressed between the components of the fastening system 217 when the fastening system 217 is assembled and tightened (e.g., the sealing tray 205 is positioned between components of the fastening system 217 along the y-axis). Thus, a large portion of compressive forces exerted by the fastening system 217 are transferred predominantly to the mounting bracket 222. Furthermore, the fastening system 217 may be used to align components of the mounting assembly 250 to enable assembly of the mounting assembly 250.

The fastening system 217 is shown in greater detail in a second cross-section 300 of FIG. 3 and a third cross-section 400 of FIG. 4. The second and third cross-sections 300, 400 each show a portion of the first cross-section 200 of FIG. 2B with different (e.g., increasing) magnification and from different angles of perspective. For example, the second cross-section 300 shows details of the fastening system 217 and its positioning relative to surrounding components, such as a metal structure 212 and components located between the fastening system 217 and the battery assembly 230, and the third cross-section 400 shows further details of the fastening system 217.

As shown in FIGS. 2B-4, the fastening system 217 may be formed of more than one component, including a battery frame 220, a nut 210, an electrically conductive bolt 204, and an electrically conductive stud 202. Some components of the fastening system 217, such as the battery frame 220, the electrically conductive bolt 204, and an upper portion of the electrically conductive stud 202, may be located above the sealing tray 205 and below the top cover 216, with respect to the y-axis. Other components of the fastening system 217, such as a lower portion of the stud 202 and the nut 210, may be located below the sealing tray 205. The fastening system 217 may be positioned adjacent to the battery assembly 230 along the z-axis, between the battery assembly 230 and the sealing tray 205.

As shown in FIG. 3-4 the components of the fastening system 217 may align (e.g., having a central axis 330 intersect with center points of the components) along the central axis 330. For example, when the battery enclosure 68 is fully assembled, the stud 202, the bolt 204, the nut 210, and the battery frame 220 may be centered about and aligned along the central axis 330. In one example, the central axis 330 may be substantially parallel with the y-axis and the direction of gravity. The central axis 330 may also be a central axis of rotation about which the components of the fastening system 217, such as the stud 202, bolt 204, and nut 210, may rotate or spin. As such, when the fastening system 217 is tightened, some of the components of the fastening system 217 (e.g., the bolt 204 and the nut 210) may be rotated around the central axis 330.

The stud 202 is formed from an electrically conductive material, such as metal (e.g., steel, stainless steel, etc.), that is ductile, rigid, and has a high compressive and tensile strength. As such, the stud 202 may facilitate transmission of a mechanical load from the sealing tray 205 to an exterior mounting structure, such as the mounting bracket 222. As well, protrusion of the stud 202 both within the battery enclosure 68 and outside of the battery enclosure 68 allows the stud 202 to form a portion of an electrical grounding path that traverses the non-conductive material of the sealing tray 205 of the battery enclosure 68.

As described above, the stud 202 may include the lower portion, e.g., a nut end 208, and the upper portion, e.g., a tap end 206. A stud base 306 may form a middle portion of the stud 202, arranged between the tap end 206 and the nut end 208. Both the tap end 206 and nut end 208 may be configured as dowels and provide protruding structures that allow components to be readily aligned and coupled thereto. The tap end 206 may be a first dowel located inside the battery enclosure 68. The tap end 206 extends upward along the y-axis from a stud base 306 of the stud 202, above the sealing tray 205. The nut end 208 may be a second dowel that extends from within the stud base 306 to an exterior of the battery enclosure 68 and the mounting assembly 250. The nut end 208 extends downward along the y-axis from a stud base 306 of the stud below the sealing tray 205 and through the mounting bracket 222. The tap end 206 and nut end 208 may be continuous with the stud base 306 and extend from the stud base 306 in opposite directions. The stud 202 may therefore be continuous structure formed of the tap end 206, the stud base 306, and the nut end 208.

As shown in FIGS. 3-4, the stud base 306 may be overmolded to, positioned within, and supported by a sealing tray bore 308 of the sealing tray 205. The sealing tray bore 308 may be an opening in the sealing tray 205. The sealing tray bore 308 may be a first opening that the stud base 306 may be inserted to and nut end 208 may be inserted through. The thickness, as defined along the y-axis, of the sealing tray 205 at the sealing tray bore 308 may be increased. The stud base 306 may extend, along the y-axis, between a gasket 340 and the mounting bracket 222, where the gasket 340 is positioned above and in contact with the stud base 306 and the lower surface 222b of the mounting bracket 222 is positioned below and in contact with the stud base 306. The sealing tray bore 308 may have a geometry configured to match a geometry of the stud base 306. For example, the stud base 306 may be shaped as a hexagonal prism and the sealing tray bore 308 may correspondingly a partial volume of a hexagonal prism. Therein, stud base 306 and sealing tray bore 308 hexagonal shape and/or geometry when viewed along the y-axis. When the stud base 306 is inserted into the sealing tray bore 308, rotation of the stud base 306 within the sealing tray bore 308 is inhibited by interference between inner walls of the sealing tray bore 308 and vertical surfaces of the stud base 306. The sealing tray bore 308 and sealing tray 205 may have six vertical walls that circumferentially surround the stud base 306 of the stud 202. Therein, the stud base 306 and stud 202 are held in place by a combination of engagements with the inner walls of the sealing tray bore 308, with the gasket 340, and with the mounting bracket 222 when the fastening system 217 is assembled.

It will be appreciated that the hexagonal geometry of the stud base 306 and the sealing tray bore 308 are non-limiting examples and different geometries are possible. For example, various shapes that include vertical edges, such as cuboid, triangular prismatic, octagonal prismatic, for the stud base 306 have been contemplated, as well as corresponding geometries of the sealing tray bore 308. It is also to be appreciated that there is a plurality of sealing tray bores 308 in the sealing tray, for which a plurality of stud bases 306 and studs 202 may be positioned within and supported by.

As shown in FIG. 4, the stud base 306 comprises a diameter 430. Diameter 430 of the stud base 306 is of a larger diameter than an outer diameter (e.g., outer diameter 520 in FIG. 5 or outer diameter 206a in FIG. 4) of the tap end 206 and a diameter (e.g., diameter 522 in FIG. 5) of the nut end 208. Diameter 430 may be similar to a diameter of the sealing tray bore 308. In one example, the stud 202 may be over molded to the sealing tray 205 which may allow the stud base 306 to have a tight fit within the sealing tray bore 308, e.g., space between the inner walls of the sealing tray bore 308 and the vertical walls of the stud base 306 is minimal. A lower aperture 304 of the battery frame 220, as shown in FIGS. 3 and 4, may be of a smaller diameter than diameter 430 of the stud base 306 and the diameter of the sealing tray bore 308. Likewise, an aperture 420 of the mounting bracket 222, as shown in FIG. 4, may have a smaller diameter than both diameter 430 of the stud base 306 and the diameter of the sealing tray bore 308. When the fastening system 217 is assembled as shown in FIGS. 2B-4, an interface between the stud base 306 and the sealing tray may be sealed by the gasket 340 and the lower surface 222b of the mounting bracket 222. An air-tight seal may therefore be formed around the stud base 306 that blocks air exchange between the interior and exterior of the battery enclosure 68. Additional features of the stud base 306 and other portions of the stud 202 are shown in greater detail in FIG. 5.

Turning to FIG. 4, the stud base 306 of the stud 202 may include a ring groove 410 that encircles and the stud base 306 along the x-z plane. An elastomeric o-ring 414 may be arranged in the ring groove 410 which may further assist in sealing the interface between the sealing tray bore 308 and the stud base 306. It will be appreciated that the ring groove 410 may be an optional component of the stud 202, and in some examples, the ring groove 410 and/or the elastomeric o-ring may be omitted.

Further features are shown in FIG. 4 of the sealing tray bore 308. The sealing tray bore 308 may have an upper portion 426 and a lower portion 428. The upper portion 426 is above the lower portion 428 of the sealing tray bore 308 along the y-axis in FIG. 4. from the upper portion 426 merges, e.g., intersects, with the lower portion 428 below the ring groove 410 along the y-axis. The inner walls of the upper portion 426 of the sealing tray bore 308 may be parallel with the y-axis. The lower portion 428 of the sealing tray bore 308 may include a section with a conical geometry at a bottom of the lower portion 428 which may match the geometry of the stud base 306. The lower portion 428 of the sealing tray bore 308 may decrease in diameter, with respect to the x-axis and z-axis, traveling downward along the central axis 330 or y axis. As described above, the matching geometries of the sealing tray bore 308 and the stud base 306 may result from overmolding of the stud 202 at the sealing tray bore 308.

Returning to FIG. 2B, the nut end 208 of the stud 202 may extend from the stud base 306 and through a second opening, the aperture 420 (e.g., aperture 420 in FIG. 4), of the lower surface 222b of the mounting bracket 222 along the central axis 330. The stud 202 may also extend through a first opening, e.g., the sealing tray bore 308 in FIGS. 3 and 4. The aperture 420 is therefore aligned with the sealing tray bore 308 along the central axis 330. The nut end 208 may protrude downward, below the mounting bracket 222, along the central axis 330. Therein, the nut end 208 may form the outer portion of the stud 202 located partially outside of the battery enclosure 68. The diameter of the aperture 420 of the mounting bracket 222 is similar to but slightly larger than the diameter of the nut end 208. The nut end 208 of the stud 202 may extend through aperture 420 to protrude below the mounting bracket 222, along the y-axis. The diameter of the nut end 208, e.g., diameter 522 in FIG. 5, may be smaller than the outer diameter of the tap end 206, e.g., outer diameter 520 in FIG. 5 or outer diameter 206a in FIG. 4.

As seen in FIG. 4, the nut end 208 comprises threading 412. The threading 412 is located along an outer surface of the nut end 208, wrapping around the outer surface of the nut end 208. It is to be appreciated the threading 412 of the nut end 208 may be non-limiting and may vary in specific features, such as number of threads per unit length. A nut 210 may be located below the mounting bracket 222 and fastened to, e.g., coupled to, the nut end 208 via the threading 412. For example, an inner surface of the nut 210 may include threading that is complementary to the threading 412 at the nut end 208. As shown in FIG. 2B, the nut 210 is positioned outside of and below the mounting bracket 222, and, when tightened with respect to the stud 202, may abut the lower surface 222b of the mounting bracket 222. By coupling the nut 210 to the nut end 208 of stud 202, and tightening and rotating the nut 210 until the nut 210 abuts the mounting bracket 222, the nut 210 may fasten the mounting bracket 222 to the stud base 306 of the stud 202.

As shown in FIG. 3, the battery enclosure 68 may include more than one of the fastening systems 217 overmolded onto the sealing tray 205. For example, the portion of the battery enclosure 68 shown in FIG. 2B includes six fastening systems 217, although more or less fastening systems 217 may be included in other examples. Each fastening system 217 may be configured as shown in FIGS. 3 and 4 and may include the stud 202, the nut 210, the battery frame 220, and the bolt 204. Although not all the fastening systems 217 may be used to electrically ground the battery assembly 230, each fastening system 217 is configured to provide a grounding path through the battery enclosure 68. Therein, a fastening system 217 may be an electrically conductive fastening system.

As shown in FIGS. 3 and 4, the tap end 206 of the stud 202 includes an inner bore 314 extending through the tap end 206 along the central axis 330 from a top of the tap end 206 down along at least a portion of a length of the tap end 206 (the top and the length defined along the y-axis). As indicated in FIG. 4, the inner bore 314 of the tap end 206 has an inner surface 408 configured with threading that extends along at least a portion of the length of the tap end 206. The threading on the inner surface 408 of the tap end 206 may be complimentary to a threading 406 of the bolt 204. It is to be appreciated the threading on the inner surface 408 may be non-limiting and may vary in specific features, such as number of threads per unit length. The tap end 206 may be a cylindrical tube with a smooth outer surface. The threading of the inner surface 408 of the inner bore 314 of the tap end 206 may engage with threading at the electrically conductive bolt 204, allowing the bolt 204 to be fastened to the stud 202. The tap end 206 has an outer diameter 206a and an inner diameter 206b, as depicted in FIG. 4, where the inner diameter 206b is a diameter of the inner bore 314.

As shown in FIGS. 2B-4, the battery frame 220 may be located above the stud base 306 of the stud 202, the sealing tray 205, and the mounting bracket 222 with respect to the y-axis. The battery frame 220 is an integrated part of the battery assembly 230. An outer surface of the battery frame 220 may be smooth and continuous. In one example, the battery frame 220 may be configured as an individual unit for each of the fastening systems 217 included in the battery enclosure 68, e.g., each fastening system 217 has a discrete unit forming the battery frame 220. In other examples, the battery frame 220 may be a common frame extending along an axis of the battery enclosure, such as the x-axis, that is coupled to more than one of the fastening systems 217 aligned along the axis. For example, all six of the fastening systems 217 shown in FIG. 3 may be coupled to a common battery frame 220 that has a corresponding quantity of bores for receiving the studs 202 and the bolts 204.

As shown in FIG. 3, the battery frame 220 comprises a first portion, hereafter referred to as a hollow portion 220a. The hollow portion 220a may have a rectangular outer geometry, e.g., shaped as a block, and a height of the hollow portion 220a may be aligned with the central axis 330, the height defined along the y-axis. As shown in FIG. 4, an inner passage 405, e.g., a bore, of the hollow portion 220a may be cylindrical and extend entirely through the height along the y-axis of the hollow portion 220a of the battery frame 220. The tap end 206 of the stud 202 may be inserted into the inner passage 405 and may be in contact with portions of an inner surface of the hollow portion 220a along the inner passage 405. The inner surface of the hollow portion 220a may have a different profile from the outer surface of the battery frame 220. For example, the inner surface of the hollow portion 220a may include hollowed areas, or cavities 220c. The cavities 220c may extend away from the central axis 330 and the inner surface of the hollow portion 220a may contact the tap end 206 of the stud 202 at regions 320 between, above, and below the cavities 220c. The regions 320 between the cavities 220c that contact the tap end 206 may provide mechanical support to the tap end 206 and maintain a position of the tap end 206 within the inner passage 405, e.g., inner passage 405 in FIG. 4, of the hollow portion 220a. The inner passage 405 extends along the y-axis from the upper end, or top, to the lower end, or bottom, of the hollow portion 220a of the battery frame 220. By including the cavities 220c in the hollow portion 220a of the battery frame 220, a weight of the battery frame 220 may be reduced.

The hollow portion 220a of the battery frame 220 may circumferentially surround the tap end 206 of the stud 202. Additionally, the height of the hollow portion 220a may be greater than the length of the tap end 206, e.g., along the y-axis, such that the top of the hollow portion 220a extends above the top of the tap end 206. An outer diameter of the hollow portion 220a may be similar to or larger than the diameter 430 of the stud base 306. An inner diameter of the hollow portion 220a, e.g., at the regions between the cavities 220c, may be similar to or larger than the outer diameter 206a of the tap end 206 of the stud 202.

As shown in FIGS. 2B and 3, the battery frame 220 may further comprise a second portion that is horizontal extension, hereafter referred to as an overhang clamp 220b. The overhang clamp 220b may extend along the z-axis, away from the hollow portion 220a of the battery frame 220 into a notch 232 in the battery assembly 230. A bottom face (with respect to the y-axis) of the overhang clamp 220b may be in face-sharing contact with a lower surface of the notch 232 such that the overhang clamp 220b may rest on the lower surface of the notch 232. The overhang clamp 220b may protrude co-planar with the x-z plane from the top end of the hollow portion 220a and may be continuous with the hollow portion 220a.

When the overhang clamp 220b is secured to the lower surface of the notch 232, e.g., by a fastening device, a position of battery frame 220 may be secured in place, e.g., such that the battery frame 220 may not slide, tilt or rotate. Therein, the overhang clamp 220b may allow the battery frame 220 to resist motion when the fastening system 217 is assembled and tightened.

The battery frame 220 may be comprised of a conductive material, such as metal, (e.g., such as steel), that may be rigid, mechanically strong, and electrically conductive. Contact between the battery frame 220 and stud 202 may electrically couple the stud 202 to the battery assembly 230 through the regions 320 in FIGS. 3 and 4. The regions 320 may also partially encircle and secure the tap end of the stud 202 from moving along the x-axis or z-axis. Additionally, the stud 202 may be electrically coupled to the battery frame 220 through contact between the battery frame 220 and the gasket 340, and through contact between the gasket 340 and the stud base 306, as shown in FIGS. 3 and 4. The stud 202 may be electrically coupled to the mounting bracket 222 via contact between the stud 202 and the mounting bracket 222. Therein, the stud 202 may electrically ground the battery assembly 230 to the mounting bracket 222 via the overhang clamp 220b and contact between the battery frame 220, gasket 340, and stud base 306. In addition, the battery frame 220 may act as a rigid structure that resists compressive forces imposed by components of the fastening system 217 positioned above and below the battery frame 220, along the y-axis, such as the nut 210 and the bolt 204, as described further below.

The fastening system 217 further includes the bolt 204. As shown in FIG. 4, the bolt 204 has a head 402 that is positioned above the stud 202 and the battery frame 220, along the y-axis. The bolt 204 also has a body 404 that extends downwards from the head 402. The head 402 may contact and abut the metal structure 212, the metal structure 212 located between the head 402 of the bolt 204 and the top of the hollow portion 220a of the battery frame 220. The contact between the head 402 of the bolt 204 and the metal structure 212 may inhibit further downwards motion of the head 402, and, therefore, of the bolt 204.

At least a portion of the body 404 of the bolt 204 may be inserted through the inner passage 405 and upper end, or top, of the battery frame 220 and into the inner bore 314 of the tap end 206 of the stud 202, along the y-axis. For example, at least a portion of a surface of the body 404 of the bolt 204 may include threading 406 configured to with engage with the threading at the inner surface 408 of the inner bore 314 of the tap end 206 of the stud 202. For this example, by rotating the bolt 204 and engaging the threading 406 of the bolt with the threading along the inner surface 408 of the inner bore 314 of the tap end 206, the body 404 of the bolt 204 may be coupled to the tap end 206 of the stud 202. The coupling between the bolt 204 and stud 202 may secure the fastening system 217 to the metal structure 212.

When the fastening system 217 is assembled, the bolt 204 may pass through and be partially enclosed by the metal structure 212. The bolt 204 may be formed of an electrically conductive metal, such as steel, stainless steel, etc. Therein, the bolt 204 may be included in a continuous electrical path along with the other components of the fastening system 217. For example, direct contact between the metal structure 212, the bolt 204, and the stud 202 may provide a continuous electrical path from within the battery enclosure 68 to outside of the battery enclosure 68, thereby electrically grounding electrical components (e.g., electrical components 270 depicted in FIGS. 2B and 3) electrically coupled to the metal structure 212.

As shown in FIGS. 2B-4, the metal structure 212 may be located above the battery frame 220, along the y-axis, and a portion of the metal structure 212 may be arranged between and in contact with the bolt head 402 and the battery frame 220, along the y-axis. The metal structure 212 may also extend between the sealing tray 205 and the fastening system 217 along the z-axis. The electrical components 270 may be coupled, e.g., electrically coupled, to the metal structure 212, as shown in FIGS. 2B and 3. In one example, the metal structure 212 may be formed of steel; however, other metals may be used and have been contemplated.

The metal structure 212 may have two portions oriented perpendicular and continuously coupled to one another. At least a portion of the metal structure 212 has a L-shaped geometry as shown in the cross-sectional views of FIG. 2B-4. For example, as shown in FIGS. 3 and 4, the metal structure 212 may have a first horizontal portion 212a extending along the x-z-plane and a second vertical portion 212b extending along the x-y plane. The metal structure 212 may have a substantially uniform thickness along the horizontal portion 212a and the vertical portion 212b. The vertical portion 212b extends upward along the y-axis from a first end of the horizontal portion 212a distal to the battery assembly 230 along the z-axis. A second end of the horizontal portion 212a, opposite of the first end, includes a sleeve 212c extending downwards along the y-axis from the second end of the horizontal portion 212a. The sleeve 212c may include a third opening (e.g., aperture 418 in FIG. 4), to receive the electrically conductive bolt 204. A bottom end of the sleeve 212c (e.g., with respect to the y-axis) may abut the top of the battery frame 220.

The sleeve 212c of the metal structure 212 includes an aperture 418, as shown in FIG. 4 through which the bolt 204 may be inserted. By inserting the bolt 204 through the aperture 418, the bolt 204 may be inserted into the inner passage 405 of the hollow portion 220a of the battery frame 220, and coupled to the tap end 206 of the stud 202. As described above, the battery frame 220 may be secured to the metal structure 212 by the bolt 204.

The metal structure 212 may be maintained in place by the bolt 204 once the bolt is tightened into the stud 202. The bolt 204 provides mechanical support and couples the metal structure 212 to the battery frame 220. The metal structure 212 is grounded separately from the bolt 204, but the metal structure 212 may be grounded through bolt 204 in a similar manner to battery assembly 230 and battery frame 220. The metal structure 212 may also provide mechanical reinforcement and support to the battery assembly 230. If a sudden and/or large transfer of force occur, the metal structure 212 may absorb, deflect, or transfer mechanical forces away from the battery assembly 230.

As shown in FIGS. 2B-3, electrical components 270, such as wiring, may be located between the metal structure 212 and the battery assembly 230 along the z-axis, and may be located between the metal structure 212 and top cover 216 along the y-axis. The electrical components 270 may be seated upon, be partially supported by, and/or shielded by the metal structure 212. The metal structure 212 may provide resistance to mechanical forces that may cause degradation to the electrical components 270 and other components of the battery enclosure 68. Forces and vibrations that may degrade electronics of the battery assembly 230 may be distributed from the horizontal portion 212a and vertical portion 212b of the metal structure 212 to the fastening system 217. In addition, the metal structure 212 may provide an electrical pathway from the electrical components 270 and other electrical components. One such electrical pathway may include the battery assembly 230 to the stud 202. As such, the metal structure 212 may also participate in grounding the electrical components 270 of the battery assembly 230 through the fastening system 217, to the outside of the battery enclosure 68.

The fastening system 217 may provide mechanical strength, electrical grounding relative, while being configured with anti-rotation, and anti-pullout attributes. When the fastening system 217 is assembled, the fastening system 217 may secure the battery enclosure 68 to the mounting bracket 222 without imposing excessive localized force on the battery enclosure 68. For example, when the bolt 204 is inserted into the tap end 206 of the stud 202, through the aperture 418 of the metal structure 212 and the inner passage 405 of the battery frame 220 at an upper region of the battery frame 220, the threading 406 of the bolt 204 may engage with the threading of the tap end 206 of the stud 202 as the bolt 204 is rotated. The bolt 204 is rotated until the head 402 of the bolt 204 abuts the sleeve 212c the metal structure 212, e.g., the bolt 204 is tightened.

Upon tightening, the head 402 of the bolt 204 may produce a downward force, as indicated by arrow 440 in FIG. 4, thereby compressing the sleeve 212c of the metal structure 212 and the battery frame 220 between the head 402 of the bolt 204 and the stud base 306. The nut 210 may be similarly tightened at the nut end 208 of the stud 202 by rotating the nut 210 until the nut 210 presses against the mounting bracket 222. Upon tightening, the nut 210 may produce an upward force, as indicated by arrow 442 in FIG. 4, thereby compressing the mounting bracket 222 between the nut 210 and the stud base 306. As the stud 202 is a single continuous unit, a vertical position of the stud 202 is maintained based on opposing forces exerted at the tap end 206 of the stud 202 by the bolt 204 and at the nut end 208 of the stud 202 by the nut 210.

The forces applied by the tightening of the bolt 204 and the nut 210 may be transferred to the other components of the fastening system 217 and to the mounting bracket 222 but not to the sealing tray 205. The sealing tray 205 is not compressed by the fastening system 217 because the sealing tray 205 is not positioned between any of the components of the fastening system 217 or between the fastening system 217 and the mounting bracket 222 along the directions of the applied forces, e.g., along the y-axis. Furthermore, the thickness of the sealing tray 205 at the sealing tray bore 308 is similar to or less than a height of the stud base 306 (the height defined along the y-axis) and compression forces imposed on the stud base 306 are not transferred to the sealing tray 205 at the sealing tray bore 308. Therein, mechanical forces may be transferred through the stronger components of fastening system 217 or fastening systems 217 and not the battery enclosure 68. At least one fastening system 217 may be configured to provide structural support for compressive and other mechanical forces. At least one fastening system 217 may be configured to provide the compressive force to form and maintain a sealed interface between the sealing tray 205 and top cover 216.

The fastening system 217, including the stud 202, bolt 204, nut 210, and battery frame 220, provides one or more electrical grounding paths for components within the battery enclosure 68, such as the battery assembly 230 and electrical components 270. Contact between the battery frame 220 and stud 202 may electrically couple the stud 202 to the battery assembly 230. Additionally, the stud 202 may be electrically coupled to the battery frame 220 through the gasket 340 and to the mounting bracket 222 at the nut end 208 of the stud 202, via the nut 210. Therein, the fastening system 217 may electrically ground the battery assembly 230 to the mounting bracket 222, while securing the sealing tray 205 to the mounting bracket 222. At least one electrically conductive fastening system 217 may be configured to electrically ground the battery assembly 230 to the mounting bracket 222. The sealing tray 205 may be secured to the mounting bracket 222 as a result of the tight fit of the stud base 306 within the sealing tray bore 308, which may result from overmolding of the stud 202 to the sealing tray bore 308. Therein, the air-tight seal between the stud base 306, sealing tray bore 308, and battery frame 220 allow for the electrical grounding may be achieved without hindering or breaking the sealing of the battery enclosure 68. Vertical motion of the sealing tray 205 may be inhibited by contact between the gasket 340 and the sealing tray 205 at the sealing tray bore 308, e.g., the gasket 340 is sufficiently wide to overlap with an upper surface of the sealing tray 205 at the sealing tray bore 308.

As described previously, the configuration of the fastening system 217, and, in particular, of the stud 202, provides additional fastening benefits. For example, the corresponding geometry of the stud base 306 and the sealing tray bore 308 may serve as an anti-rotational element of the fastening system 217, thereby impeding rotation of the stud base 306. A likelihood of the fastening system 217 becoming unfastened is thereby reduced, increasing an integrity of the fastening system 217. Additionally, the overmolding of the stud 202 allows the stud 202 to fit tightly within the surfaces of the sealing tray bore 308, which, along with friction generated the elastomeric o-ring 414, as shown in FIG. 4, and the surfaces of the sealing tray bore 308, may provide anti-pull-out capabilities. In other words, the stud 202 may not be readily slid out of the sealing tray bore 308 along the y-axis, even when the fastening system 217 is not tightened. Further details of the stud 202 are depicted in FIG. 5.

Figure 5:
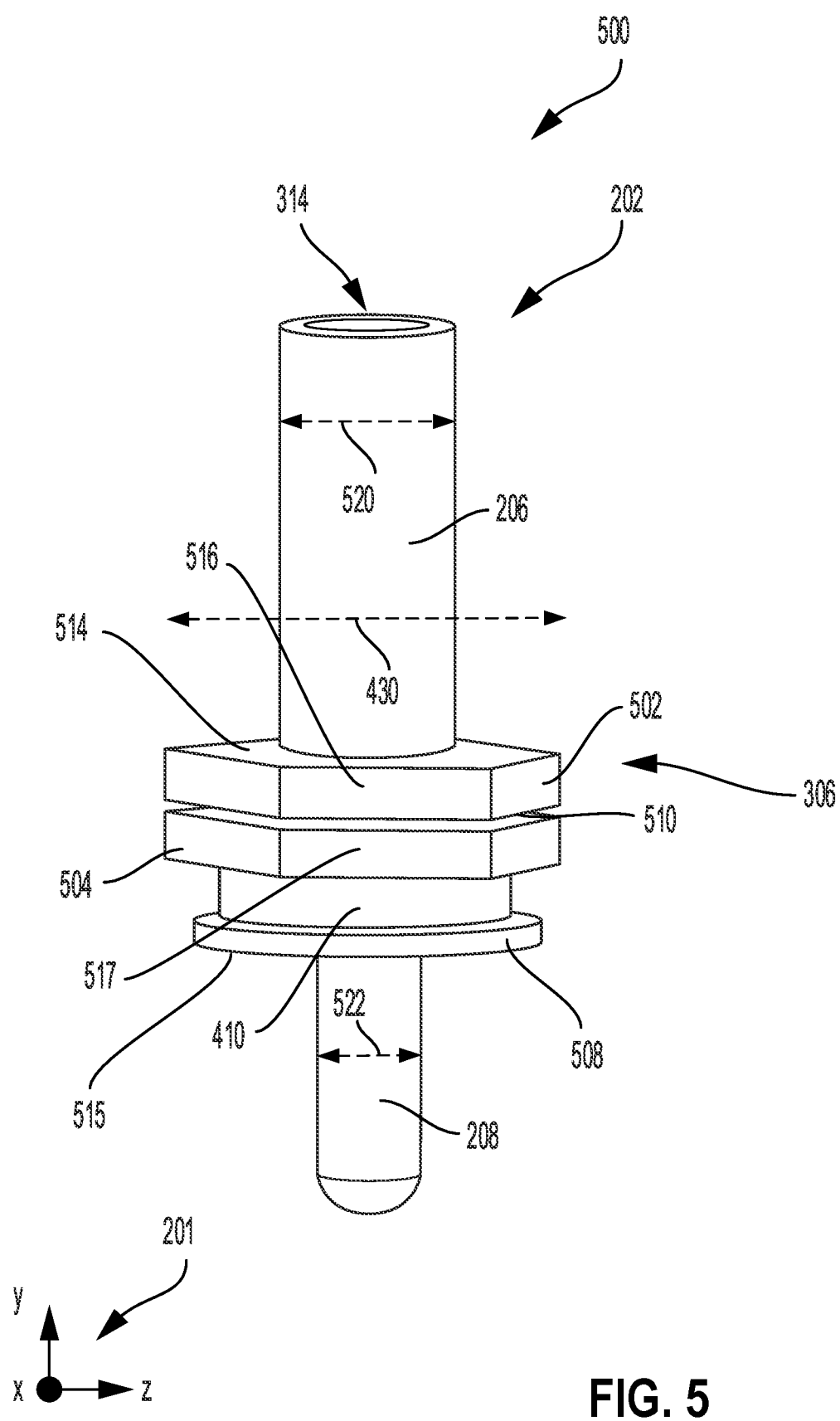
FIG. 5 shows a perspective view of a stud of the fastening system.

Turning now to FIG. 5, the stud 202 is shown in detail in a perspective view 500. The stud base 306 of the stud 202 may include three sections, or lands: an upper land 502, a middle land 504, and a lower land 508. The upper and middle lands 502, 504 may have a hexagonal outer geometry while the lower land 508 may have a circular outer geometry, when viewed along the y-axis. The upper land 502 is positioned above the middle land 504, and the lower land 508 is positioned below the middle land 504, with respect to the y-axis.

The tap end 206 of the stud 202 extends upwards from the upper land 502 of the stud base 306 and the nut end 208 of the stud 202 extends downwards from the lower land 508 of the stud base 306. It will be noted that the threaded surface of the nut end 208 of the stud 202 is omitted for brevity. The stud base 306 includes a first tangential groove as the first groove 510 and a second tangential groove which may be the ring groove 410, as shown in FIG. 4. As illustrated FIG. 5, the first groove 510 is between the middle land 504 and the upper land 502, along the y-axis. The ring groove 410 is between the lower land 508 and the middle land 504, along the y-axis.

The upper land 502 and the middle land 504 may share similar thicknesses, as defined along the y-axis. The upper land 502, and the middle land 504 may block the stud 202 from rotating when vertical surfaces of the lands (e.g., surfaces parallel with the y-axis) interface with the walls of the sealing tray bore 308 of FIGS. 3 and 4. Furthermore, the first groove 510 may act as an anti-pullout measure, preventing the stud 202 from pulling out of the sealing tray 205 in the y direction.

The upper land 502 of the stud 202 further has a horizontal (e.g., co-planar with the x-z plane) upper face 514 that may abut the gasket 340 and the lower land 508 has a horizontal bottom face 515 that may abut the mounting bracket 222 below the lower land 508, along the y-axis, as shown in FIGS. 3 and 4. The upper land 502 has a plurality of planar, vertical faces 516 that are aligned with, e.g., substantially coplanar with, a plurality of planar, vertical faces 517 of the middle land 504. The upper land 502 and the middle land 504 may be arranged within the upper portion 426 of the sealing tray bore 308, as shown in FIG. 4, while the lower land 508 may be arranged within the lower portion 428 of the sealing tray bore 308. A diameter of the lower land 508 may therefore be smaller than a diameter of the upper and middle lands 502, 504 to accommodate the conical shape of the lower portion 428 of the sealing tray bore 308.

As depicted in FIG. 5, the outer diameter 520 of the tap end 206 of the stud 202 may be larger than the diameter 522 of the nut end 208 of the stud 202 to accommodate the inner bore 314 extending through the tap end 206 while maintaining structural strength of the tap end 206. The outer diameter 430 of the stud base 306 is larger than each of the outer diameter 520 of the tap end 206 and the diameter 522 of the nut end 208. However, the relative dimensions of the stud 202 may vary in other embodiments.

In this way, a fastening system is provided for a composite battery enclosure formed of a nonconductive material. The fastening system may act as a structural member that may transfer mechanical loads and forces away from the battery enclosure while securing the battery enclosure to a mount. By configuring an electrically conductive, overmolded stud of the fastening system to extend from inside of the battery enclosure to outside of the battery enclosure, electrical components enclosed within the battery enclosure may be grounded to objects and/or structures outside of the battery enclosure. Furthermore, electrical grounding of the electrical components may be achieved without adversely affecting a sealing capacity of the battery enclosure.

The disclosure also provides support for a fastening system comprising: an electrically conductive stud overmolded into an enclosure, the electrically conductive stud extending from an interior of the enclosure to an exterior of the enclosure to provide an electrical grounding path through the enclosure. In a first example of the system, the system further comprises: a stud frame circumferentially surrounding a first portion of the electrically conductive stud, the first portion located within the enclosure, an electrically conductive bolt inserted into a bore of the first portion of the electrically, and a nut coupled to a second portion of the electrically conductive stud, the second portion located outside of the enclosure. In a second example of the system, optionally including the first example, the enclosure is formed of a non-conductive, composite material, and wherein the electrically conductive stud is overmolded at an opening in the enclosure and protrudes through the opening. In a third example of the system, optionally including one or both of the first and second examples, the electrically conductive stud has a base that is inserted through the opening in the enclosure and abuts a surface of a mounting bracket, the mounting bracket positioned below the enclosure, and wherein a diameter of the base is similar to a diameter of the opening in the enclosure. In a fourth example of the system, optionally including one or more or each of the first through third examples, the second portion of the electrically conductive stud has a threaded surface that engages with threading of the nut, and wherein the second portion extends through an opening in the mounting bracket in addition to the opening in the enclosure, the opening in the mounting bracket aligned with the opening in the enclosure and having a smaller diameter than the diameter of the opening in the enclosure and the diameter of the base. In a fifth example of the system, optionally including one or more or each of the first through fourth examples, the bore of the first portion of the electrically conductive stud extends from a top of the first portion through at least a portion of a length of the first portion towards the base of the electrically conductive stud, and wherein an outer diameter of the first portion is smaller than the diameter of the base of the electrically conductive stud. In a sixth example of the system, optionally including one or more or each of the first through fifth examples, an inner surface of the first portion of the electrically conductive stud, the inner surface surrounding the bore, is threaded to engage with a threading of the bolt. In a seventh example of the system, optionally including one or more or each of the first through sixth examples, the electrically conductive bolt extends through an opening of a metal structure arranged above the stud frame, relative to a vertical axis of the enclosure, through an upper end of the stud frame, and into the bore of the electrically conductive stud, and wherein a head of the bolt abuts the metal structure when the bolt is tightened. In a eighth example of the system, optionally including one or more or each of the first through seventh examples, the metal structure abuts a top of a first, hollow portion of the stud frame and a bottom of the first, hollow portion of the stud frame abut a gasket arranged between the bottom of the first, hollow portion of the stud frame and the base of the electrically conductive stud. In a ninth example of the system, optionally including one or more or each of the first through eighth examples, the electrically conductive stud, the stud frame, the electrically conductive bolt, and the nut are aligned along a central axis of rotation of the fastening system.

The disclosure also provides support for a battery enclosure, comprising: a sealing tray formed of a non-conductive, composite material, the sealing tray forming a portion of the battery enclosure arranged under a battery assembly, at least one electrically conductive fastening system extending from inside of the sealing tray to outside of the sealing tray through an opening of the sealing tray, the at least one electrically conductive fastening system configured to electrically ground the battery assembly to an object outside of the battery enclosure. In a first example of the system, the at least one electrically conductive fastening system is overmolded into the sealing tray at the opening of the sealing tray and wherein the at least one electrically conductive fastening system forms a sealed interface with the sealing tray at the opening of the sealing tray. In a second example of the system, optionally including the first example, the sealing tray is seated on a mounting bracket, the mounting bracket secured to a stationary object outside of the battery enclosure, and wherein the at least one electrically conductive fastening system is configured to couple the sealing tray to the mounting bracket. In a third example of the system, optionally including one or both of the first and second examples, an outer portion of the at least one electrically conductive fastening system, the outer portion protruding outside of the sealing tray, is threaded to receive a nut, and wherein the outer portion extends outside of the sealing tray from a base of the at least one electrically conductive fastening system, the base located inside of the sealing tray and having a larger diameter than the outer portion. In a fourth example of the system, optionally including one or more or each of the first through third examples, when the nut is engaged with the outer portion of the at least one electrically conductive fastening system and tightened, the nut is spaced away from the base of the at least one electrically conductive fastening system only by a thickness of the mounting bracket. In a fifth example of the system, optionally including one or more or each of the first through fourth examples, the outer portion extends outside of the sealing tray through a first opening in the sealing tray and outside of the mounting bracket through a second opening in the mounting bracket, the first opening and the second opening aligned along a central axis of rotation of the at least one electrically conductive fastening system, and wherein a diameter of the first opening is similar to a diameter of the base of the at least one electrically conductive fastening system and a diameter of the second opening is similar to a diameter of the outer portion of the at least one electrically conductive fastening system. In a sixth example of the system, optionally including one or more or each of the first through fifth examples, the battery assembly is electrically coupled to the at least one electrically conductive fastening system via a horizontal extension of the fastening system, and wherein a bolt of the at least one electrically conductive fastening system is inserted through a third opening of a metal structure to secure the at least one electrically conductive fastening system to the metal structure, the third opening aligned with a first and second openings along the central axis of rotation of the at least one electrically conductive fastening system and positioned above the first and second openings.

The disclosure also provides support for an electrically conductive fastening system, comprising: a dowel extending from within a composite enclosure to outside of the composite enclosure, a bolt arranged inside of the composite enclosure, the bolt coupled to an upper portion of the dowel and also located inside of the composite enclosure, and a stud frame circumferentially surrounding the upper portion of the dowel and extending between a base of the dowel and a head of the bolt. In a first example of the system, the base of the dowel is located inside of the composite enclosure and overmolded at an opening of the composite enclosure, and wherein the base has a hexagonal shape, the hexagonal shape configured to interface with the opening of the composite enclosure to inhibit rotation of the dowel, and wherein the opening of the composite enclosure has a corresponding geometry. In a second example of the system, optionally including the first example, the base of the dowel includes a tangential groove configured to receive an elastomeric o-ring, and wherein the elastomeric o-ring forms a sealed interface with surfaces of the opening of the composite enclosure.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fastening system comprising:
an electrically conductive stud overmolded into an enclosure, the electrically conductive stud extending from an interior of the enclosure to an exterior of the enclosure to provide an electrical grounding path through the enclosure.

2. The fastening system of claim 1, further comprising a stud frame circumferentially surrounding a first portion of the electrically conductive stud, the first portion located within the enclosure, an electrically conductive bolt inserted into a bore of the first portion of the electrically, and a nut coupled to a second portion of the electrically conductive stud, the second portion located outside of the enclosure.

3. The fastening system of claim 2, wherein the enclosure is formed of a non-conductive, composite material, and wherein the electrically conductive stud is overmolded at an opening in the enclosure and protrudes through the opening.

4. The fastening system of claim 3, wherein the electrically conductive stud has a base that is inserted through the opening in the enclosure and abuts a surface of a mounting bracket, the mounting bracket positioned below the enclosure, and wherein a diameter of the base is similar to a diameter of the opening in the enclosure.

5. The fastening system of claim 4, wherein the second portion of the electrically conductive stud has a threaded surface that engages with threading of the nut, and wherein the second portion extends through an opening in the mounting bracket in addition to the opening in the enclosure, the opening in the mounting bracket aligned with the opening in the enclosure and having a smaller diameter than the diameter of the opening in the enclosure and the diameter of the base.

6. The fastening system of claim 4, wherein the bore of the first portion of the electrically conductive stud extends from a top of the first portion through at least a portion of a length of the first portion towards the base of the electrically conductive stud, and wherein an outer diameter of the first portion is smaller than the diameter of the base of the electrically conductive stud.

7. The fastening system of claim 6, wherein an inner surface of the first portion of the electrically conductive stud, the inner surface surrounding the bore, is threaded to engage with a threading of the bolt.

8. The fastening system of claim 4, wherein the electrically conductive bolt extends through an opening of a metal structure arranged above the stud frame, relative to a vertical axis of the enclosure, through an upper end of the stud frame, and into the bore of the electrically conductive stud, and wherein a head of the bolt abuts the metal structure when the bolt is tightened.

9. The fastening system of claim 8, wherein the metal structure abuts a top of a first, hollow portion of the stud frame and a bottom of the first, hollow portion of the stud frame abut a gasket arranged between the bottom of the first, hollow portion of the stud frame and the base of the electrically conductive stud.

10. The fastening system of claim 2, wherein the electrically conductive stud, the stud frame, the electrically conductive bolt, and the nut are aligned along a central axis of rotation of the fastening system.

\* \* \* \* \*